US009866732B2

(12) United States Patent
Scurrell

(10) Patent No.: US 9,866,732 B2
(45) Date of Patent: Jan. 9, 2018

(54) SYNCHRONIZING DATA BETWEEN PERSONAL AND TIMECODE DEVICES

(71) Applicant: TIMECODE SYSTEMS LIMITED, Worcester (GB)

(72) Inventor: Paul Scurrell, Worcester (GB)

(73) Assignee: TIMECODE SYSTEMS LIMITED, Worcester (GB)

( * ) Notice: Subject to any disclaimer, the term of this patent is extended or adjusted under 35 U.S.C. 154(b) by 0 days.

(21) Appl. No.: 15/290,709

(22) Filed: Oct. 11, 2016

(65) Prior Publication Data

US 2017/0104896 A1 Apr. 13, 2017

Related U.S. Application Data

(63) Continuation-in-part of application No. 15/290,125, filed on Oct. 11, 2016.

(60) Provisional application No. 62/323,139, filed on Apr. 15, 2016, provisional application No. 62/307,820, filed on Mar. 14, 2016, provisional application No. 62/240,352, filed on Oct. 12, 2015.

(51) Int. Cl.
H04N 21/00 (2011.01)
H04N 5/073 (2006.01)
H04W 56/00 (2009.01)

(52) U.S. Cl.
CPC ............ *H04N 5/073* (2013.01); *H04N 21/00* (2013.01); *H04W 56/002* (2013.01)

(58) Field of Classification Search
None
See application file for complete search history.

(56) References Cited

U.S. PATENT DOCUMENTS

| 5,557,423 | A  | 9/1996  | Phillips et al.  |
| 5,892,552 | A  | 4/1999  | Kim              |
| 6,831,729 | B1 | 12/2004 | Davies           |
| 7,024,155 | B2 | 4/2006  | Gosieski, Jr.    |
| 7,200,320 | B1 | 4/2007  | Denecke et al.   |
| 7,321,601 | B2 | 1/2008  | Rogerson et al.  |
| 7,324,743 | B2 | 1/2008  | Hosoda           |
| 7,398,411 | B2 | 7/2008  | Zweigle et al.   |
| 7,436,899 | B2 | 10/2008 | Rogerson et al.  |
| 7,552,193 | B2 | 6/2009  | Carro            |
| 7,555,196 | B1 | 6/2009  | Crawford et al.  |

(Continued)

FOREIGN PATENT DOCUMENTS

| EP | 2 161 921 A1 | 3/2010 |
| JP | 2007-081686 A | 3/2007 |
| WO | 02/01775 A1 | 1/2002 |

OTHER PUBLICATIONS

"Clockit Timecode ACL 204 Lockit" Rev. 3.11 manual by Ambient Recording GmbH, 32 pages, copyright 2013.

(Continued)

*Primary Examiner* — Eileen Adams
(74) *Attorney, Agent, or Firm* — Brown Rudnick LLP

(57) ABSTRACT

Syncing a personal device to a timecode generator can include acquiring media data with a personal device, receiving, using a timecode module, timecode data over an RF network, transmitting a timecode package including the timecode data to the personal device, decoding the timecode package to obtain the timecode data, and embedding the timecode data into a media stream including the acquired media data.

14 Claims, 12 Drawing Sheets

(56) References Cited

U.S. PATENT DOCUMENTS

| | | | |
|---|---|---|---|
| 7,593,619 | B2 | 9/2009 | Yamasaki |
| 7,609,608 | B2 | 10/2009 | Rogerson et al. |
| 7,633,551 | B2 | 12/2009 | Sullivan |
| 7,673,316 | B2 | 3/2010 | Incentis Carro |
| 7,711,443 | B1 | 5/2010 | Sanders et al. |
| 7,743,161 | B2 | 6/2010 | Dey et al. |
| 7,881,587 | B2 | 2/2011 | Shinkai et al. |
| 7,913,157 | B1 | 3/2011 | Stoakley et al. |
| 7,929,902 | B1 | 4/2011 | Sanders et al. |
| 7,933,203 | B2 | 4/2011 | Hahm |
| 8,019,194 | B2 | 9/2011 | Morrison et al. |
| 8,643,779 | B2 | 2/2014 | Suess et al. |
| 9,049,349 | B2 | 6/2015 | Ganesan et al. |
| 2001/0044826 | A1 | 11/2001 | Ludwig et al. |
| 2002/0034255 | A1* | 3/2002 | Zetts .................. H04N 21/235 375/240.26 |
| 2002/0091495 | A1 | 7/2002 | Woodroffe |
| 2006/0035663 | A1* | 2/2006 | Cheng .............. H04M 1/72547 455/550.1 |
| 2006/0053455 | A1 | 3/2006 | Mani et al. |
| 2007/0250901 | A1 | 10/2007 | McIntire et al. |
| 2010/0158473 | A1 | 6/2010 | Wayne et al. |
| 2011/0052137 | A1 | 3/2011 | Cowie |
| 2011/0149093 | A1 | 6/2011 | Kang et al. |
| 2011/0179196 | A1 | 7/2011 | Friedman |
| 2011/0296474 | A1 | 12/2011 | Babic |
| 2012/0069943 | A1 | 3/2012 | Lim et al. |
| 2012/0236201 | A1* | 9/2012 | Larsen ................. H04N 21/235 348/468 |
| 2013/0114481 | A1 | 5/2013 | Kim et al. |
| 2013/0307971 | A1 | 11/2013 | Ganesan et al. |
| 2014/0307805 | A1* | 10/2014 | Ihara ..................... H04N 19/42 375/240.26 |
| 2014/0355947 | A1 | 12/2014 | Slamecka et al. |
| 2015/0029396 | A1 | 1/2015 | Scurrell |
| 2015/0043697 | A1 | 2/2015 | Achanta et al. |
| 2015/0098690 | A1 | 4/2015 | Abbate et al. |

OTHER PUBLICATIONS

"Clockit Timecode ACL 204 Lockit" Rev. 1.00 manual by Ambient Recording GmbH, 24 pages, copyright 2012.
"The Trilevelsync Lockit Box ACL 203" manual by Ambient Recording GmbH, 9 pages, from about 2012 or earlier.
F. Beacham, "Precision Time Code and Genlock Bring Wireless Action Cameras Into Live Broadcasting—The Broadcast Bridge Connecting IT to Broadcast," Jun. 23, 2015. Retrieved from the Internet: URL:https://www.thebroadcastbridge.com/content/entry/2879/precision-time-code-and-genlock-bring-wireless-action-cameras-into-live-bro.
"An ultra compact timecode, genlock and word clock generator with transceiver," Timecode Systems minitrx+quick start guide. Retrieved from the Internet: URL:http://www.timecodesystems.com/wp-content/uploads/2015/09/Timecode-Buddy-TRX-Plus-Quickstart-guide-web.pdf.
"Digital cellular telecommunications system (Phase 2); Radio subsystem synchronization (GSM 05.10)," European Telecommunication Standard (ETS) 300 579, vol. SMG2, Sixth Edition, Nov. 1, 1996 (Nov. 1, 1996), XP014013776.
Extended Search Report dated Feb. 7, 2017 in EP Application No. 16193386.6.
Extended Search Report dated Feb. 7, 2017 in EP Application No. 16193387.4.
Partial Search Report dated Jan. 27, 2017 in EP Application No. 16193388.2.
Non-Final Office Action dated Aug. 24, 2017 in U.S. Appl. No. 15/005,599.
Response to Office Action dated Aug. 24, 2017, filed Aug. 31, 2017 in U.S. Appl. No. 15/005,599.
Non-Final Office Action dated Oct. 5, 2015 in U.S. Appl. No. 13/948,252.
Response to OA dated Oct. 5, 2015, filed Jan. 4, 2016 in U.S. Appl. No. 13/948,252.
Final Office Action dated May 2, 2016 in U.S. Appl. No. 13/948,252.
Response to OA dated May 2, 2016, filed Aug. 1, 2016 U.S. Appl. No. 13/948,252.
Non-Final Office Action dated Sep. 23, 2016 in U.S. Appl. No. 13/948,252.
Response to OA dated Sep. 23, 2016, filed Mar. 17, 2017 in U.S. Appl. No. 13/948,252.
Final Office Action dated Jun. 2, 2017 in U.S. Appl. No. 13/948,252.
Response to OA dated Jun. 2, 2017, filed Jun. 20, 2017 in U.S. Appl. No. 13/948,252.
Non-Final Office Action dated Aug. 17, 2017 in U.S. Appl. No. 13/948,252.
Response to OA dated Aug. 17, 2017, filed Aug. 25, 2017 in U.S. Appl. No. 13/948,252.
Notice of Allowance dated Nov. 24, 2017 in U.S. Appl. No. 15/005,599 (10 pages).

* cited by examiner

SYNCHRONIZING DATA BETWEEN PERSONAL AND TIMECODE DEVICES

CROSS-REFERENCE TO RELATED APPLICATIONS

This application is a continuation-in-part of U.S. application Ser. No. 15/290,125 filed on Oct. 11, 2016. This application also claims priority to and the benefit of U.S. Provisional Application No. 62/240,352, filed on Oct. 12, 2015, U.S. Provisional Application No. 62/307,820, filed on Mar. 14, 2016, and U.S. Provisional Application No. 62/323,139, filed on Apr. 15, 2016. The entire teachings of the above applications are incorporated herein by reference in their entirety.

TECHNICAL FIELD

This disclosure relates to synchronizing data between personal and timecode devices.

BACKGROUND INFORMATION

Modern audio and video processing systems typically use multiple cameras for simultaneous audio and video recording of their subjects. For the multiple recordings to be effectively employed in post-production, where all of the raw recording materials are edited into a final recording, the audio and video signals from all utilized cameras must be carefully synchronized.

SUMMARY

In a media synchronization system, acquiring media from multiple devices can improve the quality of the final media product. Conventionally, professional media production has been limited to information captured by professional equipment connected to synchronization equipment. This disclosure describes devices and techniques that enable personal devices (e.g., smartphones and tablets) to communicate with synchronization equipment using either an external device or an internal module. Simply put, the invention allows media captured by a personal device to seamlessly integrate with video or sound recorded by professional equipment because the personal device can be synchronized.

Many media applications capture information using multiple devices. However, these multi-camera or multi-device configurations inherently pose significant data processing problems. That is, the devices must be synchronized together so that each media clip is embedded with timecode data and metadata that determines camera acquisition settings. Additional metadata can also be added at acquisition. Timecode information is used to identify a location in digital systems and on time-based media (e.g., audio or video tape) and is relied on for synchronization and reference throughout the audio, video, and post-production process. The Society of Motion Picture and Television Engineers ("SMPTE") genlock (Tri-level and Bi-Level sync signals) is an industry standard signal waveform that is relied on for synchronization and reference throughout the audio, video, and post-production process. Similarly, the audio and video signals from one camera at a given point in time may not properly align with the audio and video signals from a second camera. Without synchronization, the audio signals from one audio recorder at a given point in time may not properly align with the audio and video signals from a second camera.

In other words, if the devices are not synced, then each recorded clip of media will require manual syncing during post-production processing. This processing is both time consuming and expensive. During live events, streaming media feeds pose an even greater problem because there is no or a limited opportunity for post-production processing. Devices used for broadcasting live productions need to be synchronized together when the media is being recorded (e.g., in real-time). Therefore, ensuring that the devices are genlocked so that the cameras are in phase or synchronized with each other is important.

Implementations can include one or more of the following advantages.

Methods and devices of the invention are compatible with a variety of personal devices including smartphones, tablets, and personal computers. The invention helps to transform a mobile device that was initially developed with a casual consumer in mind into a media device that is compatible with prosumer and professional workflows without significant additional cost to the original consumer. This enables smartphones or other mobile devices, for example, to be used in dynamic filming conditions (e.g., in documentary or reality TV production) where professional camera equipment may not always be available or financially viable.

Since millions of people routinely carry mobile devices that are capable of capturing images and/or videos, the invention helps to increase the number of available media devices at sporting events, historical events, and other memorable moments. In addition, media embedded with synchronization information can be distributed using, for example, various social media platforms without having to transfer the media from the mobile devices. Simply put, a user could simply upload pre-synchronized and embedded media to the cloud servers of the social media platforms.

In some cases, the described devices include a memory port (e.g., an SD card slot). This memory port allows users to directly record media files with embedded synchronization information onto an external memory card. This helps to make the recorded information more accessible as, for example, productions can easily access "shot" material. Therefore, productions can use multiple external memory cards so that shooting can continue using a new external memory card while information from a prior external memory card is being downloaded or transmitted. In addition, metadata may be added by the user, which will accompany the timecode data. This metadata allows specific shot content to be searched for at a later date.

In other cases, the invention includes a method and device for embedding timecode data, for example, into the data stream delivered to a processor of a personal device because the timecode module is embedded in the camera sensor chip. For example, conventional cameras can include a system on chip (SOC) that receives light through the camera lens. Conventional SOCs process the detected light information and encode media data into standard video streams formats (e.g., in an H24 and MPEG format). These video streams are then transmitted to a processor of a personal device. This means that the personal device can easily access the information without specialized processing techniques. By having a timecode module embedded in the SOC, the media data stream sent to the processor of the personal device already includes the timecode data without requiring additional processing steps by the personal device.

In one aspect, the invention includes a method for syncing a personal device to a timecode generator including acquiring media data with a personal device, receiving, using a timecode module, timecode data over an RF network, transmitting a timecode package including the timecode data to the personal device, decoding the timecode package to obtain the timecode data, and embedding the timecode data into a media stream including the acquired media data.

In another aspect, the invention includes a system for syncing a personal device including a timecode generator configured to send timecode data over an RF network and a personal device having a camera. The personal device includes a communication module configured to send data using a wireless connection, a timecode module a processing module configured to generate a timecode package from the timecode data, and a decoder module configured to decode the timecode package to obtain the timecode data. The timecode module includes an RF transceiver configured to receive timecode data from the timecode generator using the RF network.

In another aspect, the invention includes a method for syncing a personal device to a timecode generator includes connecting a personal device to an adapter having a timecode module, wherein the timecode module includes an RF transceiver, acquiring media data with the personal device, receiving, using the timecode module, timecode data over an RF network, sending a timecode package including the timecode data to the connected personal device, decoding the timecode package to obtain the timecode data, and embedding the timecode data into a media stream including the acquired media data.

In yet another aspect, the invention includes an adapter for connecting a personal device to a timecode generator including a housing configured to removably connect to the personal device. The housing includes an RF transmitter configured to receive and send timecode data over an RF network to a timecode generator, a special purpose logic circuit programmed to encode and decode the data, and a connector compatible with the personal device.

In another aspect, the invention includes a method for syncing a camera to a timecode generator includes acquiring media data using a camera sensor system chip, and embedding, using the processing unit, the timecode data into a media stream including the acquired media data. The chip includes one or more image sensors, a processing unit configured to receive media data from the one or more image sensors, and a timecode module configured to receive timecode data from a timecode generator and to send the timecode data to the processing unit.

In yet another aspect, the invention includes a camera sensor chip including one or more image sensors, a processing unit configured to receive media data from the one or more image sensors, and a timecode module configured to receive timecode data from a timecode generator and to send the timecode data to the processing unit.

In another aspect of the invention, a system for syncing a personal device to a timecode generator includes a personal device and an adapter configured to removably connect to the personal device, the system being configured to "Timecode Sync" the camera media generated by the smartphone camera over a Wi-Fi/BT AND RF network. The personal device includes a Wi-Fi/Bluetooth module/transceiver, a timecode software application, and an electrical connector. The adapter includes an electrical connector, an RF transceiver, firmware, and a memory port.

Implementations can include one or more of the following features.

In some implementations, the method further includes displaying the timecode data on a display of the personal device.

In some implementations, the method further includes uploading the embedded media stream to a website using a wireless connection.

In some implementations, the website includes, at least, one of Facebook, YouTube, and Twitter.

In some implementations, the method further includes storing the embedded media stream on the personal device.

In some implementations, decoding the timecode package includes accessing an API on the personal device.

In some implementations, the personal device is a mobile phone.

In some implementations, the mobile phone is a smartphone.

In some implementations, the personal device is any one of a mobile phone, a tablet, or a laptop.

In some implementations, the method further includes displaying the timecode data on a display of the personal device.

In some implementations, the method further includes uploading the embedded media stream to a website using a wireless connection.

In some implementations, the decoder module is further configured to embed the timecode data into a media data stream acquired by the camera.

In some implementations, the decoder module includes an API compatible with the timecode package.

In some implementations, the website includes, at least, one of Facebook, YouTube, and Twitter.

In some implementations, the method further includes storing the embedded media stream on the personal device.

In some implementations, decoding the timecode package includes accessing an API on the personal device.

In some implementations, the adapter further includes a power source connected to the transmitter and the special purpose logic circuit and a memory port for receiving a removable memory component.

In some implementations, the removable memory component is an SD card.

In some implementations, the special purpose logic circuit is further programmed to derive a signal waveform compatible with a personal device and a sound synchronization input circuitry.

In some implementations, the personal device is a smartphone, tablet, or laptop.

In some implementations, the connector is USB or Lightning connector.

In some implementations, the timecode data is SMPTE timecode data or LTC timecode data.

In some implementations, the camera sensor timecode module includes: an RF transceiver configured to receive the timecode information over an RF network.

In some implementations, the camera sensor timecode module further includes one or more logic gates configured to encode and decode the timecode data.

In some implementations, the timecode module is further configured to receive synchronization data from the timecode generator.

In some implementations, the synchronization data includes genlock data.

In some implementations, the method further includes: synchronizing the one or more image sensors with an image sensor of another device using the genlock data.

In some implementations, the timecode module includes: an RF transceiver configured to receive the timecode information over an RF network.

In some implementations, the camera sensor timecode module further includes one or more logic gates configured to encode and decode the timecode data.

In some implementations, the timecode module is further configured to receive synchronization data from the timecode generator.

In some implementations, the synchronization data includes genlock data.

In some implementations, the adapter further includes a battery, to self-power and charge the personal device.

In some implementations, the connector is USB or Lightning connector.

In some implementations, the system further includes an SD card for the memory port.

These and other aspects, features, and implementations, and combinations of them, may be expressed as apparatus, methods, methods of doing business, means or steps for performing functions, components, systems, program products, and in other ways.

Other aspects, features, and advantages will be apparent from the description and drawings, and from the claims.

BRIEF DESCRIPTION OF THE DRAWINGS

Features and advantages of the claimed subject matter will be apparent from the following description of embodiments consistent therewith, which description should be considered with reference to the accompanying drawings.

For a thorough understanding of the present disclosure, reference should be made to the following description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DESCRIPTION

In general, this disclosure relates to a scalable system that facilitates synchronization across, for example, professional media equipment, and personal devices. This synchronization includes providing timecode, genlock, and metadata to the personal devices using wireless networks systems.

The scalable system includes devices, transceivers, controllers, and/or adapters that cooperate to ensure that each camera, sound recording device, and the personal device receives accurate timecode sync data and/or Word Clock or Genlock signals. In some examples, a two-way data exchange is accomplished using the spare bandwidth associated with each timecode frame transmission. The transmitted and received data can be multiplexed from many sources to form an RF network also referred to herein as "B:LINK™." Examples of such sources including devices, modules, transceivers, controllers and/or adapters and methods are described herein.

Figure 1:
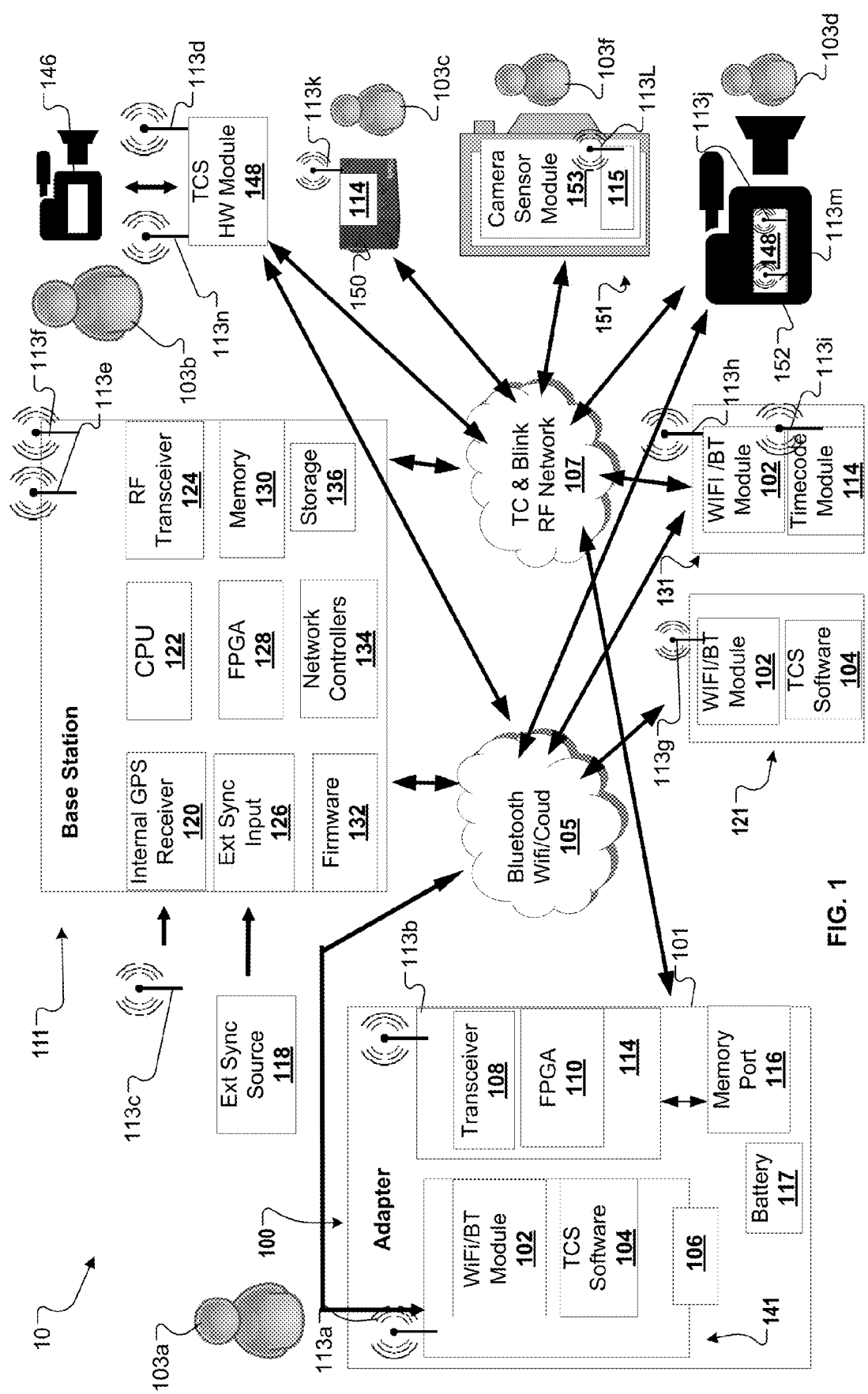
FIG. 1 is a schematic illustrating an exemplary network environment in which one embodiment of the disclosure may operate.

Referring to FIG. 1, a system 10 includes a base station 111 and multiple media devices. The media devices include personal devices 141, 121, and 131, professional cameras 146 and 152, and a personal camera 150. Each of the media devices can be used by their respective user 103a-d. The base station 111 is configured to provide timecode, genlock, metadata or a combination thereof to the media devices over a wireless network 105 (e.g., using Bluetooth or Wi-Fi connection) or over a second radio frequency (RF) network (e.g., a B:LINK network 107) via the wireless network systems using via one or more antennas 110a-110n. For clarity, the antennas 110a-n will be referred to generally as an antenna 113.

The personal devices 141, 121, and 131 can be a computer, a mobile phone (e.g., a smart phone), a handheld tablet device (e.g., an IPad), or any other mobile network device capable of capturing media and running an application (e.g., a software application 104). As shown in FIG. 1, the personal devices 141, 121, and 131 each includes a communication module 102. The communication module 102 enables the personal device to communicate over Wi-Fi, Bluetooth, or other wireless networks.

Figure 2:
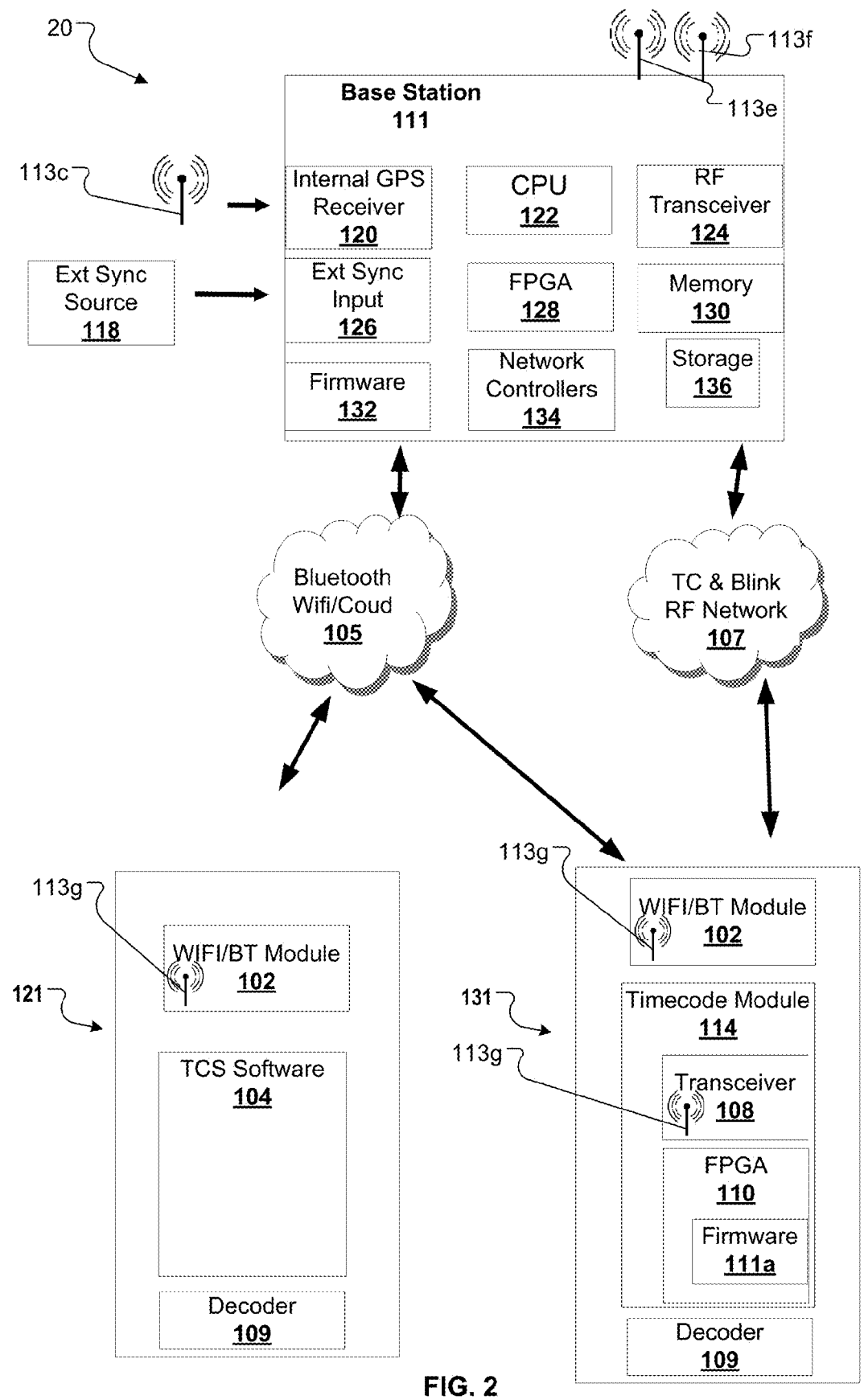
FIG. 2 is a schematic illustrating a personal device (e.g., a mobile device) with a software application and a personal device (e.g., a mobile device) with a timecode module in accordance with one embodiment of the present disclosure.
Figure 3:
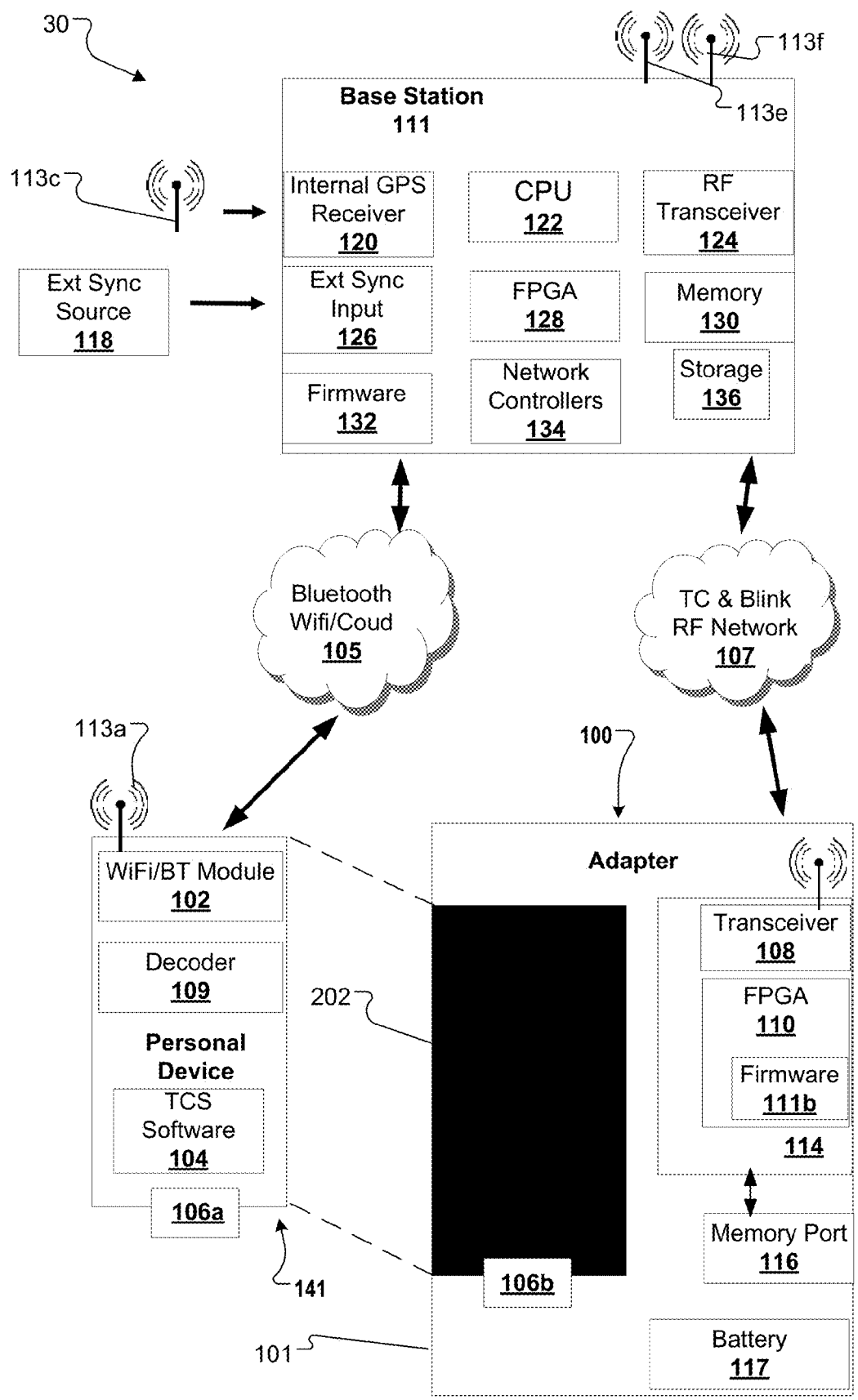
FIG. 3 is a schematic illustrating an adapter for a personal device (e.g., a mobile device) for syncing the personal device with a timecode generator in accordance with one embodiment of the present disclosure.
Figure 4:
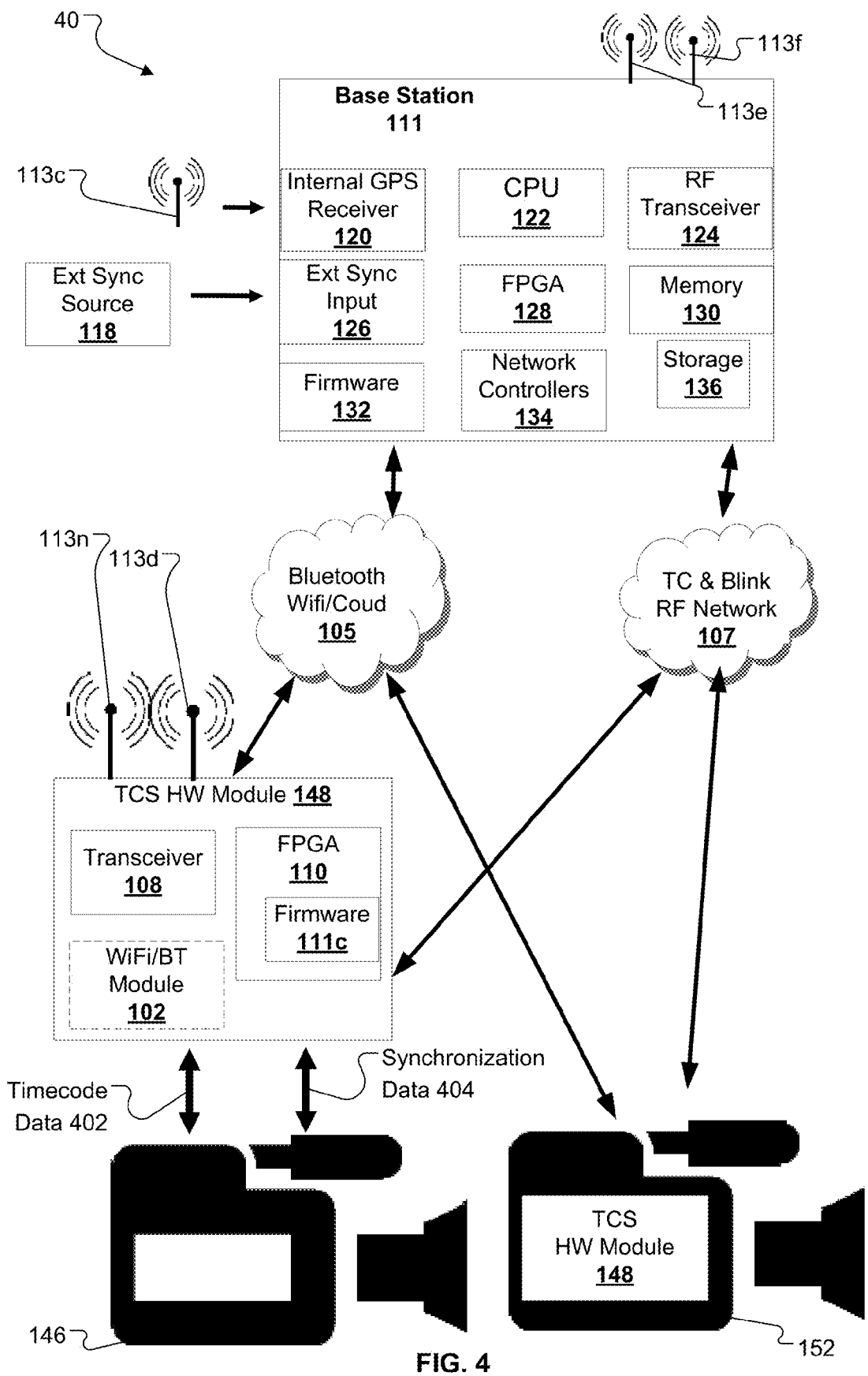
FIG. 4 is a schematic illustrating a timecode module connected to a professional camera and a timecode module embedded in a professional camera.
Figure 5:
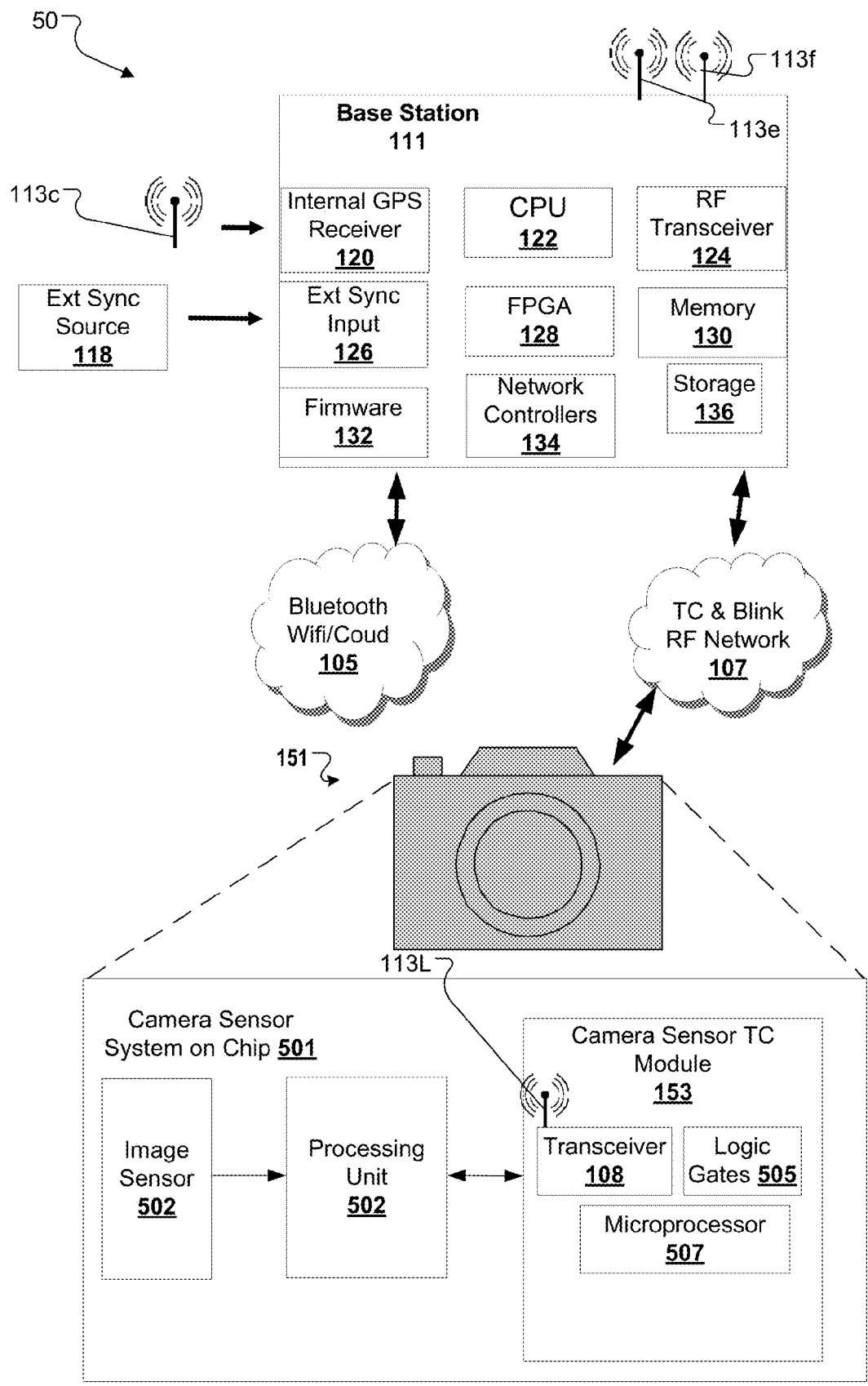
FIG. 5 is a schematic illustrating a personal camera having a sensor system on chip (SOC) including a timecode module.

For clarity, the system 10 is simplified to show the personal devices 121 and 131 in FIG. 2, the personal device 141 and the adapter 100 in FIG. 3, the professional cameras 146 and 152 in FIG. 4, and the personal camera 151 in FIG. 5.

Referring to FIGS. 1-3, the personal devices 121 and 141 each includes a software application 104. The software application 104 can receive and use the timecode data, status data, configuration data, and metadata created and transmitted by the base station 111. The software application 104 can also receive available metadata created by other media devices. For example, in some cases, the metadata is received by the base station 111 and then relayed over a wireless network for the software application 104 to store and use in a database. The metadata sent by the base station 111 could, for example, include useful metadata to unlock sharing of content or commercially purchased and acquired clips or music tracks.

In addition, the transfer of metadata from the media devices can simplify post-production processing. For example, a user can associate info or notes with specific content during filming because the logged information can simplify the identification or tracking of specific clips during post-production. The logged information becomes 'searchable metadata'. To allow this user input content to be re-linked with the original media files some identifiers must be embedded to enable the software to find the correct notes for the correct media clips. The transmitted or stored data and the metadata from the recording camera can function as these key identifiers, which enables re-linking in standard non-linear editing ("NLE") systems and/or third-party logging applications. Simply put, the final timecode file can be embedded with inserted metadata (e.g., from the B:LINK network) in a video format (e.g., mp4).

The media devices can receive data electrical signals and waveforms packets that allow reconstruction of timecode, genlock and configuration data that is transmitted by the base station 111 through any one of the antennas 113.

In some cases, a personal device can also include or be electrically connected to a version of a synchronization module (e.g., a timecode module 114, a timecode hardwire module 148, or a timecode sensor module 115), which enables communication over an RF network, (e.g., the B:LINK network 107).

The timecode module 114 and the timecode hardwire module 148 are generally similar, except for differences in the firmware versions programmed onto the respective FPGAs. In some cases, the physical form of the synchronization module is also adapted to the desired personal device. For example, the various firmware versions are configured to enable a timecode module to communicate with the desired device and the firmware versions account for hardware (e.g., the connector type) and communication protocols of the desired device. As will be discussed elsewhere, the synchronization modules can include FPGA. The timecode sensor module 115, however, is part of a camera sensor on a chip (SOC), and, therefore, cannot be reconfigured after manufacture. Instead, in some cases, the logic gates of the FPGA are manufactured directly onto the SOC.

For example, the timecode module 114 of the personal device 150 (e.g., a GoPro Hero4 camera) is configured to communicate directly with the HERO4 HeroBus multi-pin connector. In this example, the physical form factor of the module 114 can also be designed to clip on to the HERO4 as a 'BacPac' design. In this example, apart from these differences the functionality is similar between the module 114 and the timecode hardwire module 148.

In another example, the differences between the timecode module 114 in the adapter 100 and the timecode module 114 of the personal device 150 can be found in the firmware to communicate with the different electrical interfaces of the personal device 150 (e.g., a GoPro HERO 4 30 pin HeroBus connector) and the personal device 141 (e.g., an Apple Lightning connector or an Android micro USB connector) for example.

By way of overview, a synchronization module receives accurate timecode and sync information. For example, the synchronization module syncs from an external RF source (e.g., a base station) of timecode information (e.g., B:LINK data packets). The synchronization module participates in a 2-way-communication with the base station 111, and the synchronization module communicates with an associated personal device (HERO4, iPhone, or tablet) to embed the timecode and/or sync information into the recorded media of the personal device and, in some cases, to offer remote control of the associated personal device via the B:LINK network.

FIG. 1 shows examples of each of the synchronization modules and an associated personal device. The synchronization modules (e.g., the timecode module, the Wi-Fi modules, the hardwire timecode modules, and any combination thereof) can be used to either transmit the accurate synchronization and configuration data to other devices when operating in a control mode (e.g., a "master" mode), or to receive highly accurate synchronization or configuration data from another device when operating in a dependent mode (e.g., in "slave" mode). In operation, for example, the base station 111 provides timecode and sync data to any one of the timecode modules 114, 148, or 153 or the software application 104, which is relayed to its respective media device (e.g., the devices 121, 131, 141, 146, 150, or 152). In this example, the media devices are configured as devices operating in a "slave" or dependent mode while the base station 111 is operating in a "master" or control mode.

All or part of the processes can be implemented as, special purpose logic circuitry, e.g., an FPGA and/or an application-specific integrated circuit (ASIC).

Referring to FIGS. 1 and 2, the personal device 131 includes a timecode module 114, a communication module 102, and a decoder module 109. The decoder module 109 can include an API protocol or similar mechanism that is configured to process a timecode package generated by a synchronization module (e.g., the timecode module 114, the timecode hardwire module 148, or the sensor timecode module 153) to obtain timecode data. In some examples, the decoder 109 is also configured to process synchronization data (e.g., genlock data).

The timecode module 114 includes an internal RF transceiver (e.g., the RF transceiver 108), and an FPGA 110. The FPGA 110 is used to encode, decode the RF sync data packets, and also derive the necessary signal waveforms for cameras and sound synchronization input circuitry.

Referring to FIG. 1, the personal camera 150 (e.g., a Hero4 camera by GoPro®) includes the timecode module 114, which enables the personal camera 150 to exchange information with the base station 111 over the B:LINK network 107. In this example, the timecode data is embedded on an SD card of the personal camera 150 so that the SD card can be removed and later processed. In this case, the media is recorded with embedded timecode information. In some cases, 2-way metadata, control, and status are transmitted to and from the base station 111. The timecode module 114 (also known as Timecode Systems SyncBac PRO, Timecode Systems SyncBac or GoPro HERO 4 timecode module) has an internal RF antenna 113 and a user selectable external antenna port for longer reception range.

In some examples, initial sync lock accuracy between the base station 111 and the timecode module 114 or the timecode hardwire module 148 is about 20 microseconds and subsequently improves to a lock accuracy of 1 to 5 microseconds after approximately 1 minute.

The RF transceiver 108 enables the adapter 100 to communicate with the base station 111 over the B:LINK network 107. The frequency band that the RF transceiver 108 uses for data communication is a sub-GHz long range robust data format. For example, the adapter 100 can communicate with the base station 111 using the ISM-sub-GHz band (865 MHz to 928 MHz). The sub-GHz long range robust data format (also referred to as a B:LINK protocol) can be the protocol described in U.S. application Ser. No. 62/240,352, filed on Oct. 12, 2015, which is incorporated by reference in its entirety.

The difference between the software application 104 and the timecode module 114 is that the software application 104 decodes the timecode data via the Wi-Fi interface and software, whereas the timecode module 114 decodes the timecode and sync data via the RF transceiver 108 and the FPGA 110. By decoding the timecode and sync data via the transceiver 108 and the FPGA 110, the timecode module 114 can be more accurate than the software 104 alone. For example; if the Wi-Fi Timecode Signal is sent to the software application 104 on a personal device (e.g., an iPhone, iPad, smartphone, or tablet), there can be an accuracy of around 30 milliseconds drift between all units 'listening' and the master. In contrast, if a timecode synchronization module (e.g., the timecode module 114) is available to decode the RF data packets of the B:LINK network (microprocessor and FPGA), there is an improved accuracy of 1 to 5 microseconds drift between 'listening' units and the master.

Referring to FIGS. 1 and 3, the personal device 141 is connected to an adapter 100 via a connector 106 (e.g., a micro-USB or lightning connector). The adapter 100 includes a housing 101, a timecode module 114, a memory card port 116, and a battery 117. The memory card port 116 is a physical port allowing the adapter 100 to use external flash memory cards including SD, mini-SD, micro-SD, or any other similar format. The memory card port 116 is configured to receive media embedded with timecode information from the timecode module 114 for storage. In some cases, the embedded data can additionally or alternatively be streamed over a network via 3G/4G/Wi-Fi as H.265, H.264 for example.

The personal device is connected 702 to the adapter using a mechanical and electrical connection. For example, an iPhone can be electrically connected to the adapter using a lightning compatible connection. Additionally, the adapter can include another connection mechanism to temporarily retain the personal device within the housing.

The battery 117 is the primary source of power for the adapter 100. In some cases, the battery 117 can charge the personal device 141 via the connector 106. As shown in FIG. 3, the personal device 141 is removable from the adapter 100. The housing 101 includes an opening 202 sized to receive the personal device 141. In some cases the opening 202, is sized to receive a phone or a tablet, for example.

Referring to FIGS. 1 and 4, the professional cameras 146 and 152 each include a timecode hardwire module 148. As shown in FIG. 1, the timecode module 148 can be embedded or connected to a camera. For example, the timecode hardwire module 148 is embedded within the professional camera 152 and connected to the professional camera 146. In some cases, the timecode hardware module 148 includes a communication module 102 that allows the base station 111 to send timecode data 402 and/or sync data 404 over a wireless network. Because the timecode hardwire module can be directly connected with the camera processors, the professional cameras 146, 152 can be synchronized (e.g., genlocked) with another camera that is also in communication with the base station 111.

If a camera also includes a similar communication module, the camera's communication module can be used to communicate with the base station 111. In some examples, the timecode module 148 will not include the communication module 102 if, for example, the camera's communication module can be used.

In some examples, the timecode module 114 or the timecode hardwire module 148 includes an internal clock. If the RF signal from the base station 111 is corrupt or out of range, then the timecode module 114 or the timecode hardwire module 148 rely on their respective internal clocks. When the timecode module 114 or the timecode hardwire module 148 receives reliable data packets from the base station 111, the transceivers 150a-c can soft-sync back to lock with a master device (e.g., the base station 111). For example, the accurate internal generator (e.g., internal clock) of the timecode module 114 or the timecode hardwire module 148 is constantly soft-synced from the received and decoded RF data packets when the timecode module 114 or the timecode hardwire module 148 are operating in slave mode. This helps to keep the internal clocks in phase or synchronized with the other system devices to reduce possible drift when the timecode module 114 or the timecode hardwire module 148 lose contact with the base station 111.

Referring to FIGS. 1 and 5, the camera 151 includes an exemplary sensor system on chip (SOC) 501. The SOC 501 generally includes one or more image sensors 502 (e.g., CMOS sensors) and a signal processing unit 505. Conventional SOCs encode media data into standard video streams (e.g., in an H24, MPEG format). The SOC 501 also includes a sensor timecode module 153 embedded in the SOC 501. The sensor timecode module 153 includes an RF transceiver 108 for communicating (e.g., exchanging timecode and data packets) with a base station over the B:LINK network, for example. The sensor module 153 also includes multiple logic gates 505 that are embedded into the sensor timecode module 153 during manufacturing of the SOC 501. These logic gates 505 are generally arranged to function as the logic gates of the FPGAs described throughout this disclosure. This means that the logic gates 505 also function to encode and/or decode the RF sync data packets and also to derive the necessary signal waveforms for cameras and sound synchronization input circuitry. To modify the function of the logic gates 505, a new SOC would be required as they are not "reprogrammable" in the manner that an FPGA is. The sensor timecode module 153 can also optionally include a microprocessor 507 to support the timecode data processing.

The image sensors 502 send acquired image and/or video data to the signal processing unit 505. The timecode sensor module 153 also sends timecode and/or synchronization data (e.g., genlock data) to the signal processing unit 505. This enables the processing unit 505 to generate a stream of the acquired media data that already includes the timecode data. When a device receives this data stream, additional processing (e.g., decoding) is not required to associate the timecode data with the acquired media data.

In addition, the timecode sensor module 153 is in direct communication with the processing unit 505 that controls the image sensors 502. Therefore, when the timecode sensor module 153 receives synchronization data, this communication can be sent to the processing unit, which can then synchronize (e.g., genlock) the camera with another device (e.g., another camera that also communicates with the base station.

In some cases, the SOC 501 is optimized to reduce any redundant circuitry and logic by sharing circuitry and logic between the various components of the SOC 501.

Referring again to FIG. 1, the base station 111 is a networked programmable timecode generator. The device is intended to be moveable between sites and stationary during use. For example, the device can be installed in a rack-mountable format for semi or permanent installation, which is compatible with a motion picture filming location, permanent venue, or temporary venue. The base station 111 may generate timecode data through a temperature compensated crystal oscillator ("TCXO") reference oscillator, an oven-controlled crystal oscillator ("OXCO") reference oscillator, a rubidium atomic clock, GPS time, NTP, or similar technology. The base station 111 generates data using an internal master clock or using external time information while simultaneously distributing, via wired and wireless networks, timecode, synchronization data and/or control data to networked devices needing timecode data. In some cases, the base station can gather camera status information using a closed network (e.g., an RF network), and display this compiled information over a graphical user interface ("GUI") of a computing device. This status information can include SD card status, battery status, recording status or a combination thereof.

The CPU 122 serves as the primary microprocessor for the base station 111 and can have a single or multiple cores. The CPU 122 may include one or more microprocessors and/or processing devices. The CPU 122 may include any appropriate processor and/or logic that are capable of receiving and storing data, and of communicating over a network.

The memory 130 is the primary memory component for the base station 111 and can be SRAM, DRAM, or any other standard volatile or non-volatile memory. For example, the memory 130 can include a hard drive and a random access memory storage device, such as a dynamic random access memory, machine-readable media, machine-readable hardware storage devices, or other types of non-transitory machine-readable storage devices.

In some cases, the base station 111 receives external synchronization input 126 from an external sync source 118. Additionally or alternatively, the base station 11 can receive external timing information using a GPS receiver 120.

The FPGA 128 and the firmware 132 function as the control program or firmware for the generation of timecode and sync data, and for the RF transceiver 124. The frequency band that RF transceiver 124 of the base station 111 uses for data communication is a sub-GHz long range robust data format. For example, the base station 111 can communicate with the system devices using the ISM-sub-GHz band (865 MHz to 928 MHz). The sub-GHz long range robust data format (also referred to as a B:LINK protocol) can be the protocol described in U.S. application Ser. No. 62/240,352, filed on Oct. 12, 2015, which is incorporated by reference in its entirety. The base station 111 can transfer timing data and configuration data within data packets using the B:LINK protocol over the B:LINK network 107. In between the timing data packets, the base station 111 can receive or send configuration or status information from other devices (e.g., cameras, sound devices, and lens devices) over the B:LINK network 107.

Figure 6A:
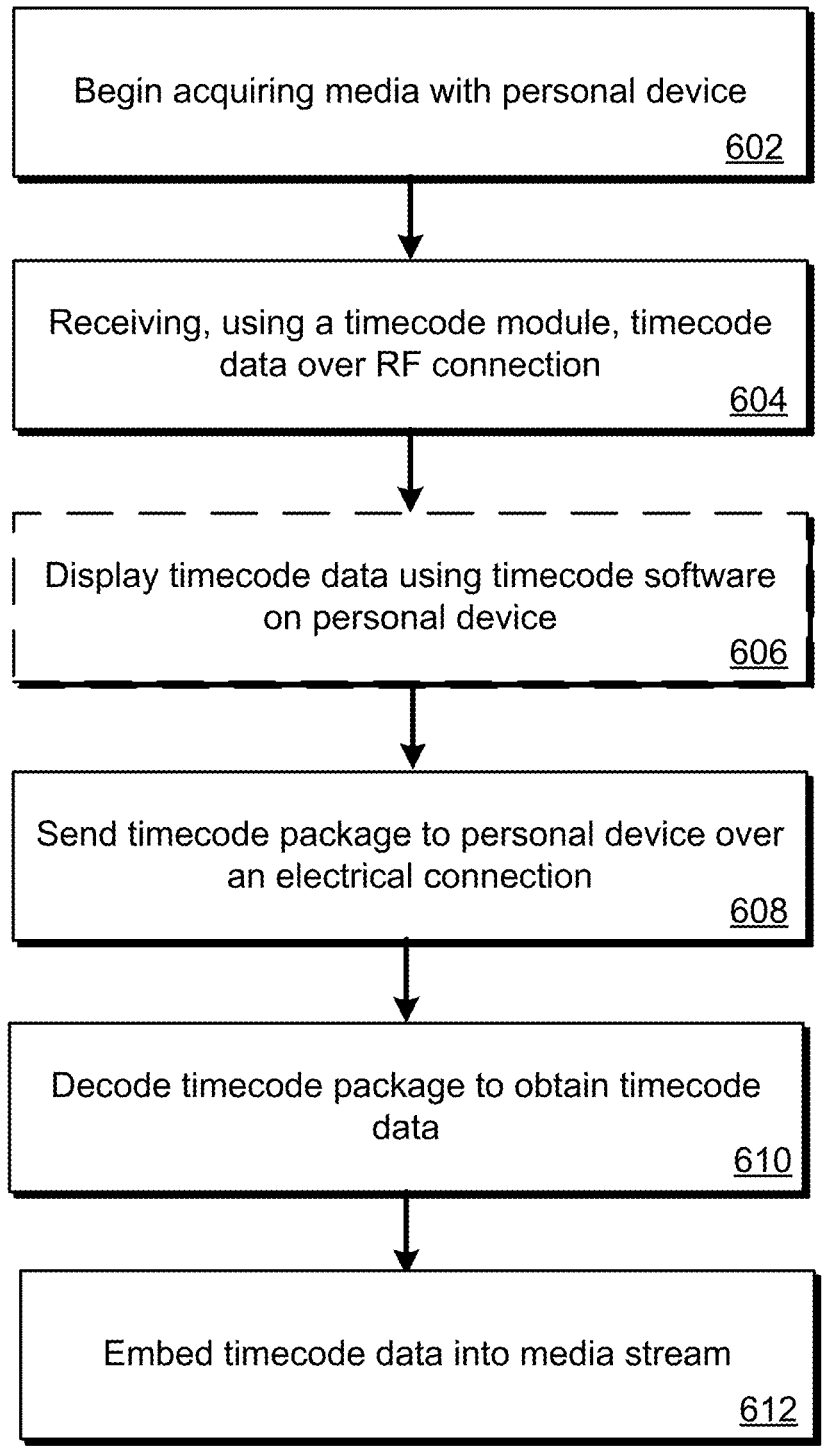
FIG. 6A is a flow chart diagramming an example process for acquiring timecode information and embedding the timecode information into a media stream.
Figure 6B:
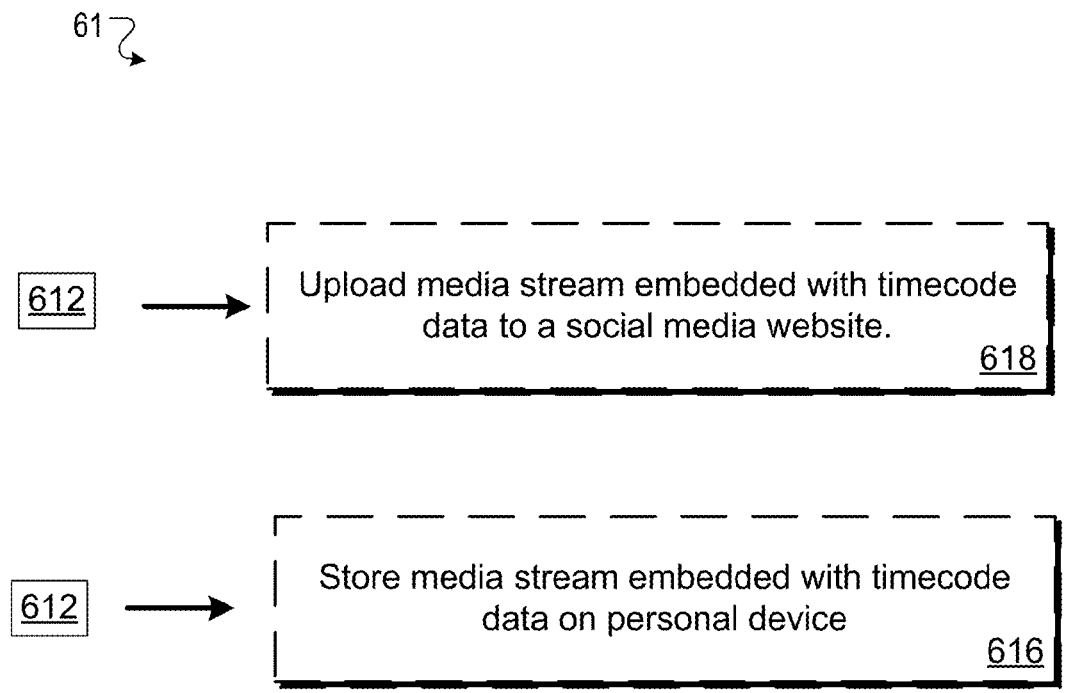
FIG. 6B is a flow chart diagramming additional optional steps following embedding the timecode information into the media stream.

FIG. 6a shows a method 60 for syncing a personal device to a timecode generator. Initially, media (e.g., video or sound data) is acquired 602 with the personal device. As the personal device is acquiring media, the personal device is receiving 604 timecode data over an RF connection using a timecode module. This timecode data can optionally be displayed 606 on the personal device using a timecode software application. After receiving the timecode data, the timecode module can send 608 a timecode package to the personal device over an electrical connection. This timecode package can include the timecode data in an encoded format, for example. The personal device can then decode 610 the timecode package (e.g., using an API) to obtain the timecode data. The personal device can then embed 612 the timecode data into a media stream of the acquired media. As shown in FIG. 6B, the embedded media stream can optionally be uploaded 618 to a website (e.g., Facebook®, YouTube®, Twitter®). Alternatively or additionally, the embedded media stream can be stored 612 on the personal device.

Figure 7:
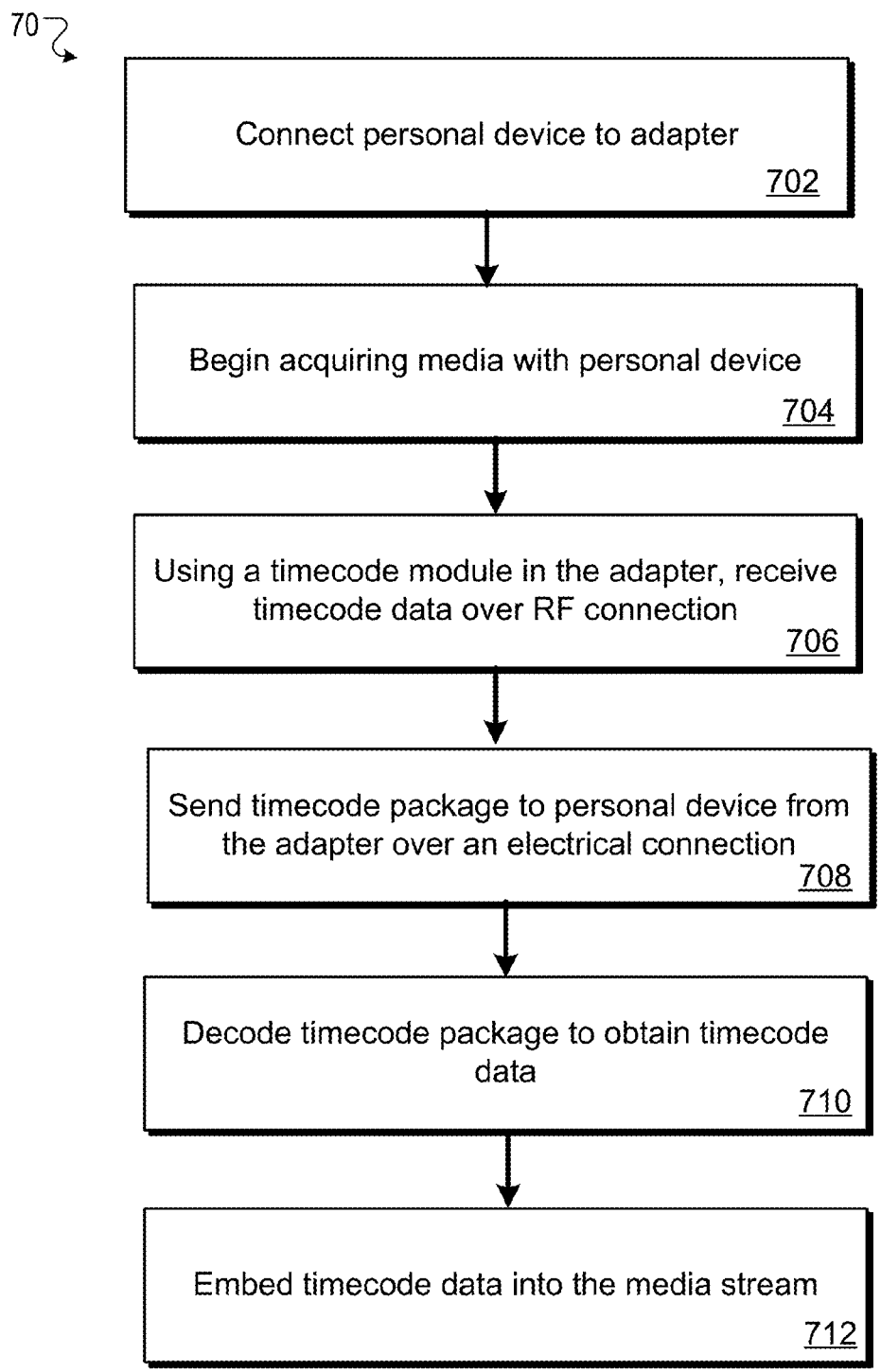
FIG. 7 is a flow chart diagramming an example process for acquiring timecode information for a personal device using an adapter with a timecode module.

FIG. 7 shows a method 70 for syncing a personal device to a timecode generator using an adapter. The personal device is connected 702 to the adapter using an electrical connector. Then, a camera of the personal device begins acquiring 704 media. The timecode module in the adapter receives 706 timecode data over an RF connection (e.g., over the B:LINK network). The received timecode data can be sent 708 from the adapter to the personal device as a timecode package. The personal device can then decode 710 the timecode package to obtain the timecode data. After decoding the timecode package, the personal device can embed 712 the timecode data into a media stream of the acquired media. In other words, the personal device can generate a media stream that includes data from the acquired media and timecode data that is now associated with the acquired media.

Figure 8:
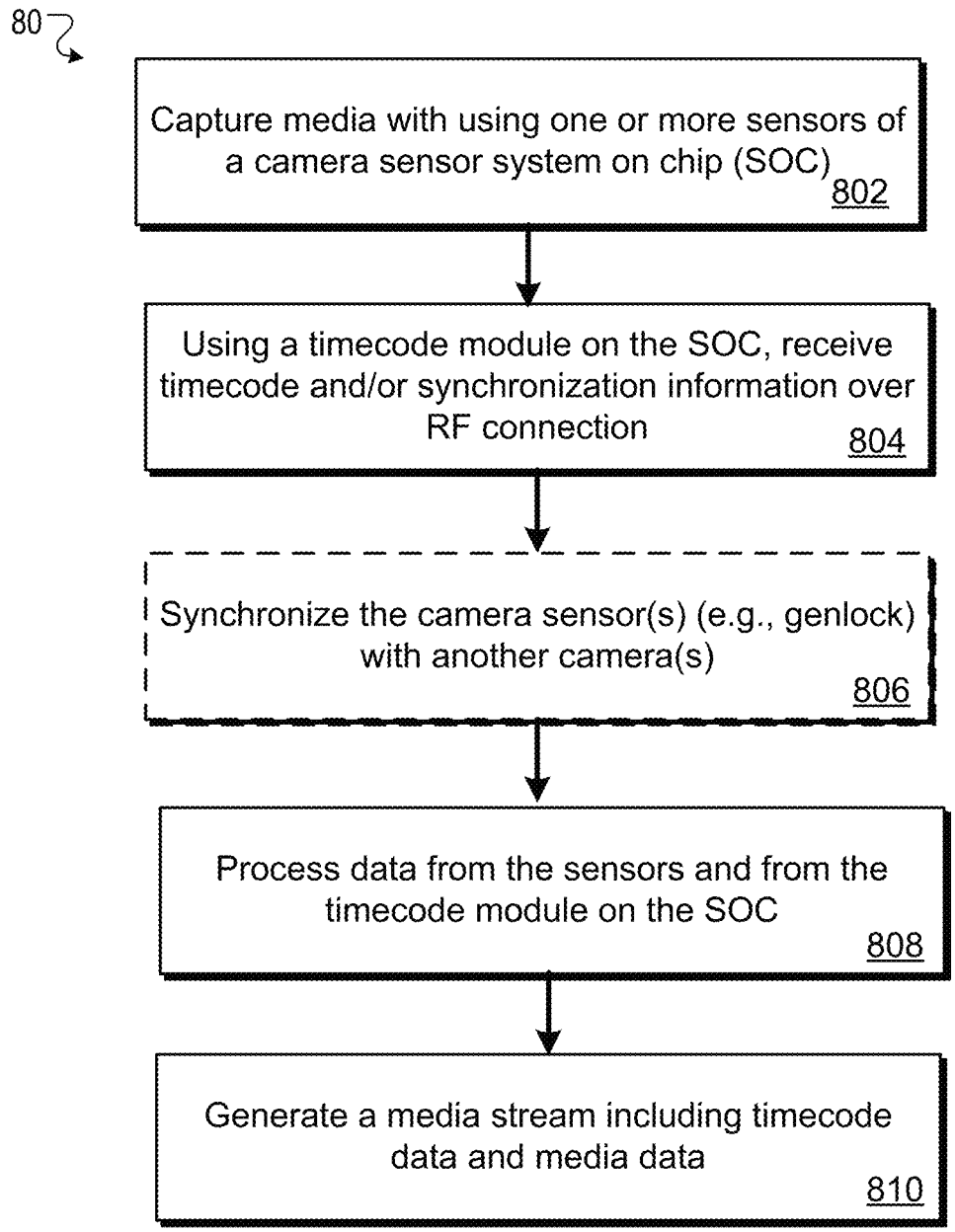
FIG. 8 is a flow chart diagramming a method of using a camera sensor chip (SOC) with a timecode module to generate a media stream including timecode and media data.

FIG. 8 shows a method 80 for syncing a camera to a timecode generator using a timecode module on the camera chip (e.g., a camera system on chip (SOC)). For example, a camera can acquire 802 media using one or more sensors of a camera sensor system chip (SOC). Using a timecode module on the SOC, the SOC receives 804 timecode and/or synchronization data over an RF connection (e.g., over the B:LINK network). If synchronization data is received, the camera can optionally synchronize 806 the camera sensor(s) (e.g., genlock) with another camera(s). As media data and is acquired and timecode and/or synchronization data is received, the camera SOC can process 808 the data and generate 810 a media stream including the acquired media data embedded with the timecode data.

In some cases, a personal device (e.g., a mobile phone) in communication with a timecode module (through an internal or external connection) can initiate a synchronization process with a base station. For example, the personal device can detect a base station near the device. The personal device can then request timecode and/or genlock information from the base station. After the personal device receives the requested timecode and/or genlock information over a connection, the device can synchronize to the base station based on the received information. This can help to ensure that any cameras near a base station are synchronized with the base station. This can be useful during an event, for example. In some cases, the personal device can optionally record media and store the media embedded with the timecode and/or genlock information.

Figure 9:
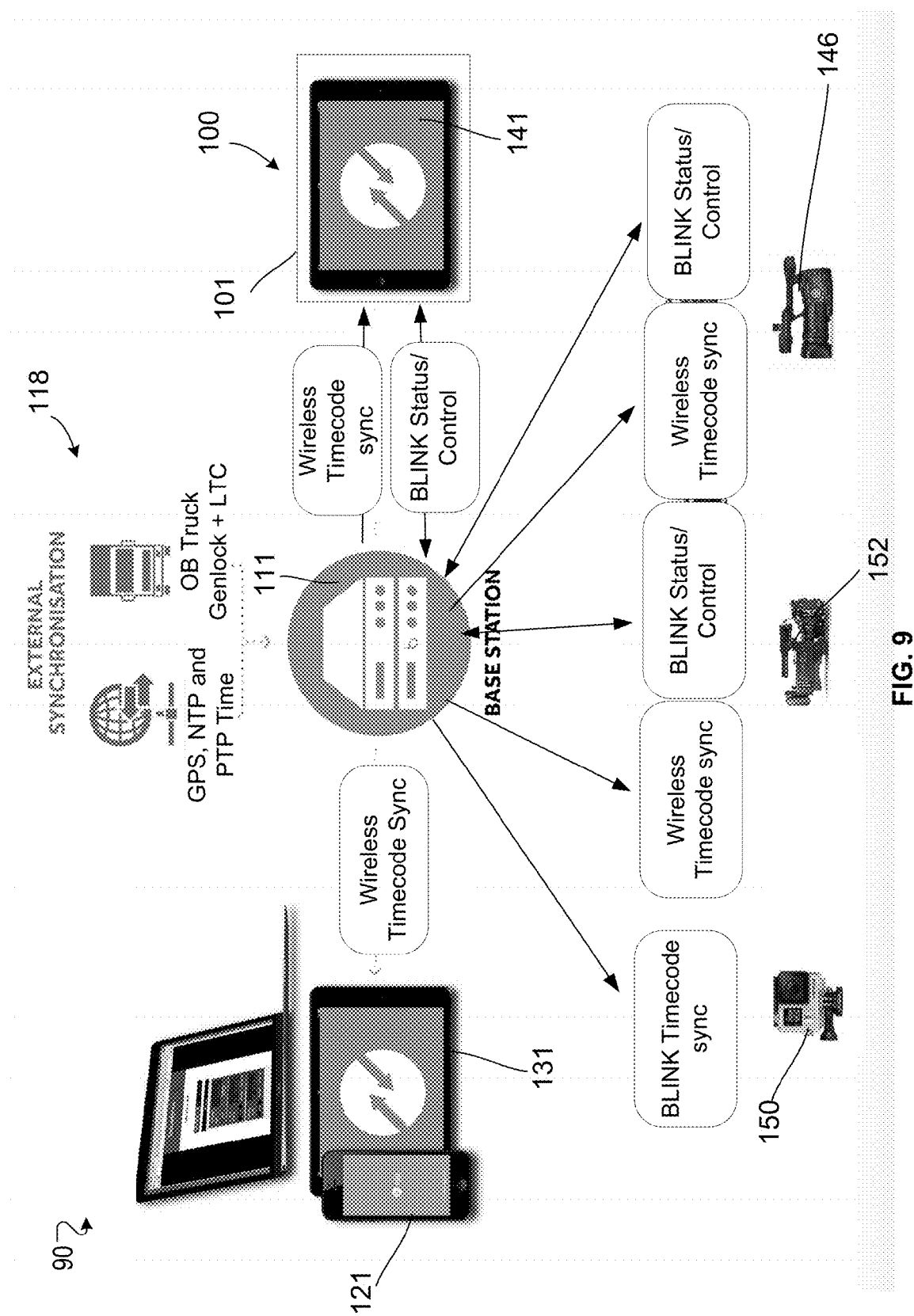
FIG. 9 is a schematic illustrating an exemplary environment for synchronizing timecode and genlock data between multiple personal media devices and professional media devices. The synchronization and/or the media devices can be monitored and, in some cases, controlled by multiple computing devices including personal computing devices.

Referring to FIG. 9, a synchronization system 90 is shown that is configured to synchronize a combination of personal and professional cameras and communicate status and control information from the cameras to multiple networked devices over two wireless networks. For example, the synchronization system 90 includes a personal camera 150, professional cameras 146, 152, and personal devices 121, 131, and 141.

As shown in FIG. 3, the personal device 141 is connected to the housing 101 of the adapter 100. In this example, the base station 111 sends timecode sync information over a Wi-Fi or Bluetooth connection to the personal devices 121, 131, and 141. As shown, each of the personal devices is represented as a tablets or smartphones. Therefore, each personal device includes a Wi-Fi or Bluetooth module without requiring modifications for compatibility with the synchronization system 401. However, because the adapter 100 includes a timecode module 114 (as shown in FIGS. 1-3), the base station 111 can also exchange (e.g., pushing and pulling information) status and/or control information with the personal device 141 over the B:LINK network.

Like the adapter 100, the timecode hardwire module 148 enables the base station to exchange status and/or control information with the professional cameras 146 and 152 over the B:LINK network. As shown in FIG. 4, the timecode hardwire module 148 may be internal or external to the professional camera.

The personal camera 150 (e.g., a Hero4 cameras by GoPro®), the timecode module 114 enables the base station 111 to exchange timecode sync information over the B:LINK network. In this example, the timecode data and possible metadata are embedded on an SD card of the personal camera 150 so that the SD card can be removed and later processed.

Figure 10:
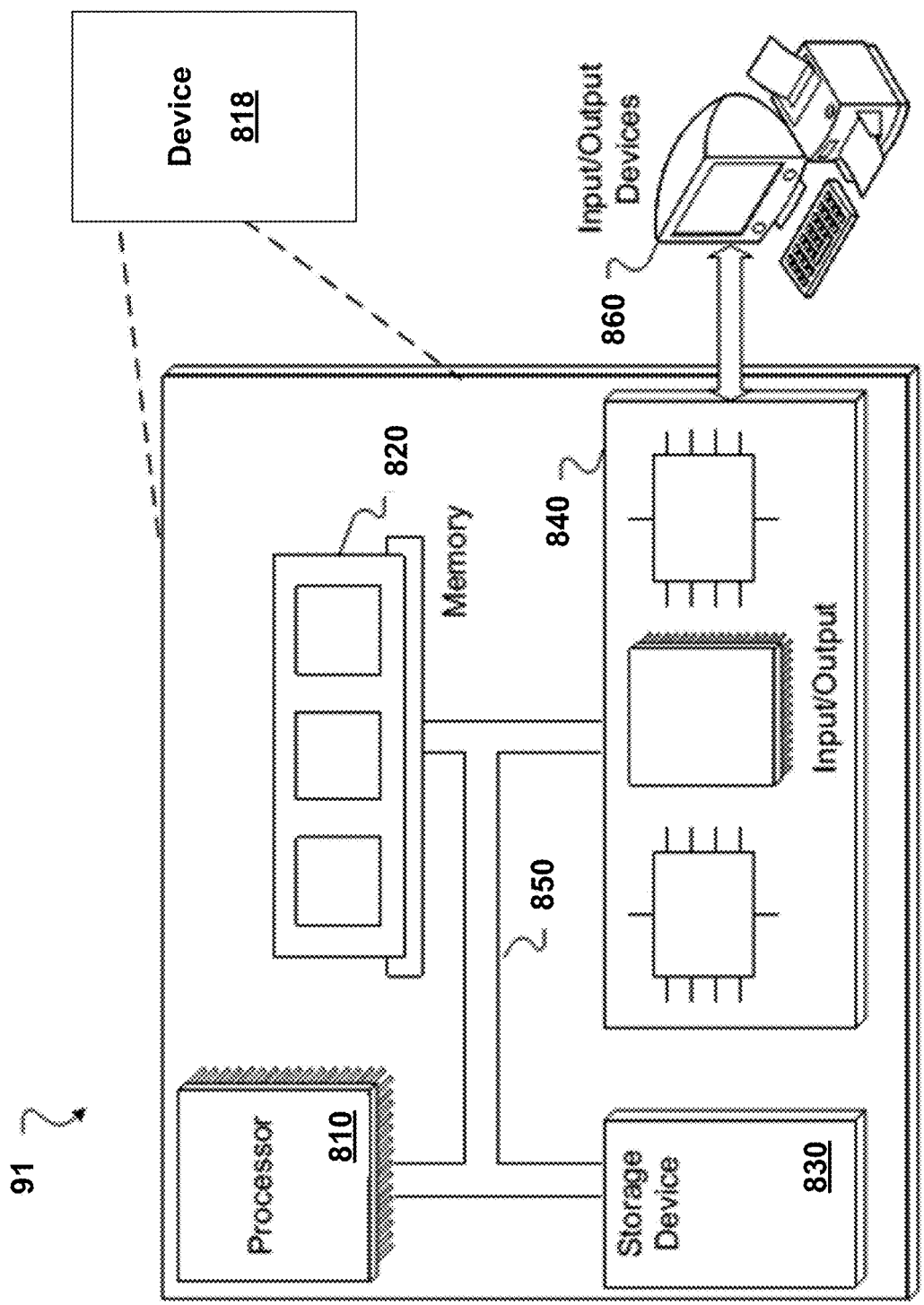
FIG. 10 illustrates a hardware configuration of the system shown in FIG. 1.

FIG. 10 is a block diagram of an exemplary computer system 91. For example, referring to FIG. 1, the system 10 can include the system 91. The system 800 includes a processor 810, a memory 820, a storage device 830, and an input/output device 840. Each of the components 810, 820,830, and 840 can be interconnected, for example, using a system bus 850. The processor 810 is capable of processing instructions for execution within the system 91. In some implementations, the processor 810 is a single-threaded processor. In some implementations, the processor 810 is a multi-threaded processor. In some implementations, the processor 810 is a quantum computer. In some implementations, the processor 810 is a FPGA. In some implementations, the processor 810 is an Application Specific Integrated Circuit (ASIC). The processor 810 is capable of processing instructions stored in the memory 820 or on the storage device 830. The memory subsystem 820 may contain instructions that when executed by the processor 810, cause the system to detect a base station, request timecode and/or genlock information, and synchronize with the received timecode and/or genlock information.

Using the described components, the system 91 is operable to synchronize with a timecode generator (e.g., the device 818). The system may receive timecode and/or genlock information through the use of one or more input/output device, labeled "I/O" in FIG. 10.

The memory 820 stores information within the system 91. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 91. In some implementations, the storage device 830 is a computer-readable medium. In some implementations, the storage device 830 can include, for example, a hard disk device, an optical disk device, a solid-state drive, a flash drive, magnetic tape, or some other large capacity storage device. In some implementations, the storage device 830 may be a cloud storage device, e.g., a logical storage device including multiple physical storage devices distributed over a network and accessed using a network. The input/output device 940 provides input/output operations for the system 91. In some implementations, the input/output device 940 can include one or more of a network interface devices, e.g., an Ethernet card, a serial communication device, e.g., an RS-232 port, and/or a wireless interface device, e.g., an 802.9 card, a 3G wireless modem, a 4G wireless modem, or a carrier pigeon interface. In some implementations, the input/output device can include driver devices configured to receive input data and send output data to other input/output devices, e.g., keyboard, printer, and display devices 860. In some implementations, mobile computing devices, mobile communication devices, and other devices can be used.

Figure 11:
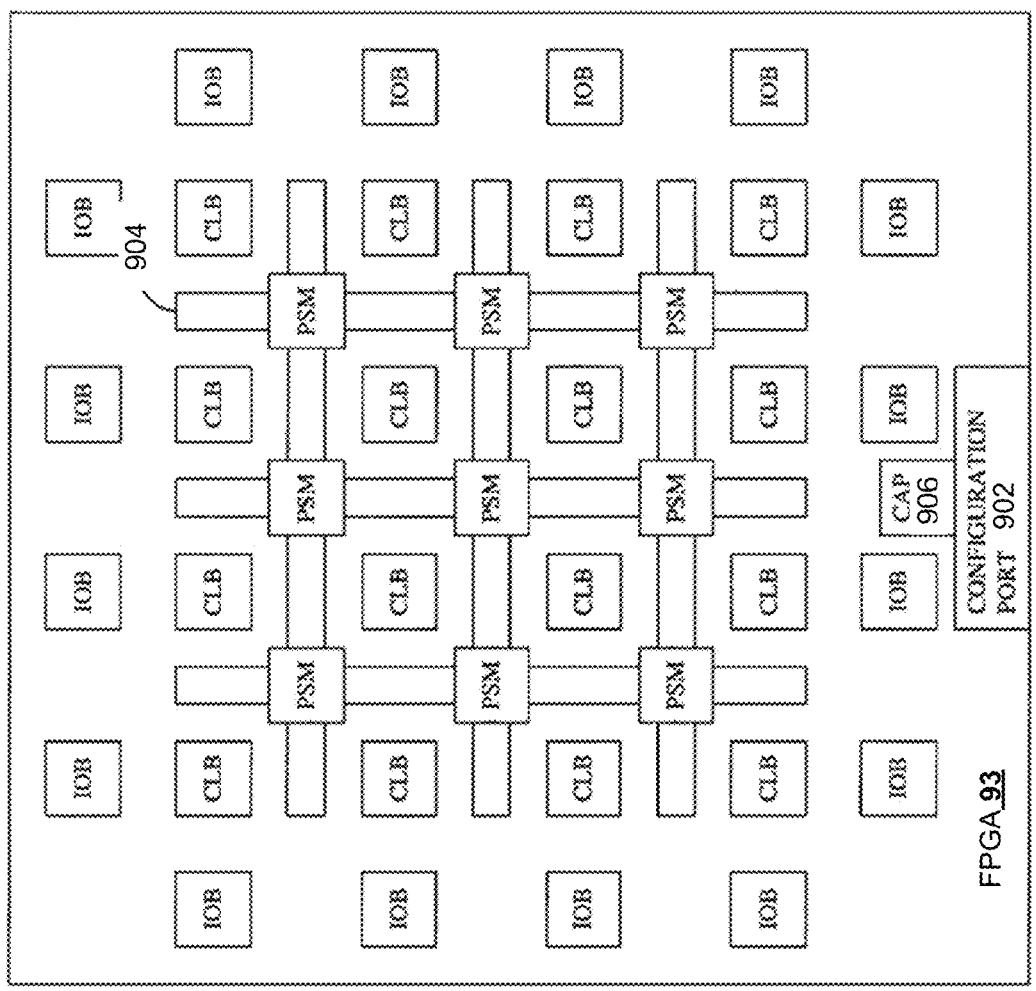
FIG. 11 is a simplified schematic of a conventional a field programmable gate array (FPGA) for use with the system shown in FIG. 1.

FIG. 11 is a simplified schematic of a conventional FPGA 93. The FPGA 93 includes user logic circuits such as input/output blocks (IOBs), configurable logic blocks (CLBs), and a programmable interconnect 904, which contains programmable switch matrices (PSMs). The CLB can include logic blocks made of logic gates (e.g., NAND gates), an interconnection of multiplexers, a lookup table, and PAL style wide input gates, and other compatible logic blocks.

Each IOB and CLB can be configured through a configuration port 902 to perform a variety of functions. This configuration can be accomplished using a number of programming technologies compatible with reconfigurable architectures (e.g., static memory, flash, and anti-fuse based programming technologies.) A programmable interconnect 904 can be configured to provide electrical connections between the various CLBs and IOBs by configuring the PSMs and other programmable interconnection points (PIPS, not shown) through a configuration port 902. Typically, the IOBs can be configured to drive output signals or to receive input signals from various pins (not shown) of the FPGA 93.

The FPGA 93 also includes dedicated internal logic. Dedicated internal logic performs specific functions and can only be minimally configured by a user. For example, a configuration port 902 is one example of dedicated internal logic. Other examples may include dedicated clock nets (not shown), power distribution grids (not shown), and boundary scan logic (i.e. IEEE Boundary Scan Standard 1149.1, not shown).

The FPGA 93 is illustrated with 16 CLBs, 16 IOBs, and 9 PSMs for clarity only. Actual FPGAs may contain thousands of CLBs, thousands of IOBs, and thousands of PSMs. The ratio of the number of CLBs, IOBS, and PSMs can also vary.

While certain implementations have been described above, other implementations are possible. For example, while the adapter 100 is generally shown without a cover, a cover may be used to protect a connected personal device.

While the timecode module is generally shown as an internal component within a media device, other implementations are possible. For example, the timecode module can be removable from the media device. In other examples, the timecode module can be an external module electrically connected to the camera.

While the adapter is generally shown as having a rectangular shape, other shapes may be used. For example, a circular shape can be used to help protect the corners of the device from damage. As new handheld devices are released with different form factors, the adaptor module will change.

While the exemplary wireless protocols are described, other protocols that are compatible with a personal device (e.g., a smartphone) can be used. For example, an iPhone can include 802.11a/b/g/n/ac Wi-Fi; Bluetooth 4.0 wireless technology; Bluetooth 4.2 wireless technology; and NFC, and each of these protocols, alone and in any combination, is compatible with the disclosed methods, devices, and systems.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, firmware, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment or implementation in a Field Programmable Gate Array (FPGA) or compiled firmware embedded in an Application Specific Integrated Circuit (ASIC). A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto-optical disks; CD-ROM and DVD-ROM disks; or any other type of non-transitory storage medium suitable for storing electronic instructions, and each coupled to a computer system bus. The processor and the memory can be supplemented by, or incorporated in, special purpose logic circuitry. The components of the system can be interconnected by any form or medium of digital data communication, e.g., a communication network. Examples of communication networks include a LAN and a WAN.

Processor refers to any device or system of devices that performs processing operations. A processor will generally include a chip, such as a single core or multi-core chip, to provide a central processing unit (CPU). A processor may be provided by a chip from Intel or AMD. A processor may be any suitable processor such as the microprocessor sold under the trademark XEON E7 by Intel (Santa Clara, Calif.) or the microprocessor sold under the trademark OPTERON 6200 by AMD (Sunnyvale, Calif.).

While this disclosure has been particularly shown and described with references to example embodiments thereof, it will be understood by those skilled in the art that various changes in form and details may be made therein without departing from the scope of the disclosure encompassed by the appended claims.

Other implementations are within the scope of the following claims.

What is claimed is:

1. A system for syncing a personal device, the system comprising:
   a timecode generator configured to send timecode data over an RF network; and
   a personal device having a camera, the personal device comprising:
   a communication module configured to send data using a wireless connection,
   a timecode module including:
      an RF transceiver configured to receive timecode data from the timecode generator using the RF network when the timecode module is operating in a slave mode,
      an internal clock configured to generate timecode data when the timecode module is operating in a master mode in response to an RF signal from the timecode generator becoming corrupt or out of range, and
      a processing module configured to generate a timecode package from the timecode data, and
   a decoder module configured to decode the timecode package to obtain the timecode data.

2. The system of claim 1, wherein the decoder module is further configured to embed the timecode data into a media data stream acquired by the camera.

3. The system of claim 1, wherein decoder module comprises an API compatible with the timecode package.

4. The system of claim 1, wherein the personal device is a mobile phone.

5. The system of claim 1, wherein the mobile phone is a smartphone.

6. The system of claim 1, wherein the personal device is any one of a mobile phone, a tablet, or a laptop.

7. A camera sensor chip comprising:
   one or more image sensors; a processing unit configured to receive media data from the one or more image sensors, and a timecode module configured to receive timecode data from a timecode generator when the timecode module is operating in a slave mode and to send the timecode data to the processing unit, the timecode module further configured to generate the timecode data when the timecode module is operating in a master mode in response to an RF signal from the timecode generator becoming corrupt or out of range, the timecode module comprising an RF transceiver configured to receive the timecode data over an RF network when the timecode module is operating in the slave mode.

8. The chip of claim 7, wherein the timecode module further comprises one or more logic gates configured to encode and decode the timecode data.

9. The chip of claim 7, wherein the timecode module is further configured to receive synchronization data from the timecode generator.

10. The chip of claim 9, wherein the synchronization data includes genlock data.

11. A system for syncing a personal device to a timecode generator, the system comprising:
   a personal device having a camera, the personal device comprising:
      a Wi-Fi/Bluetooth module/transceiver;
      a timecode software application; and
      an electrical connector; and
   an adapter configured to removably connect to the personal device, the adapter comprising:
      an electrical connector;
      an RF transceiver;
      firmware; and
      a memory port,
   the system being configured to "Timecode Sync" camera media generated by the personal device using Wi-Fi/BT and an RF network, wherein the RF transceiver is configured to receive timecode data when the system is operating in a slave mode and wherein the timecode software application generates the timecode data when the system is operating in a master mode in response to an RF signal from the timecode generator becoming corrupt or out of range.

12. The system of claim 11, the adapter further comprising a battery, to self-power and charge the personal device.

13. The system of claim 11, wherein the connector is USB or lightning connector.

14. The system of claim 11, further comprising an SD card for the memory port.

* * * * *